US009539664B2

(12) United States Patent
Fagan

(10) Patent No.: US 9,539,664 B2
(45) Date of Patent: Jan. 10, 2017

(54) METHODS AND SYSTEMS FOR PREDICTIVE TORCH HEIGHT CONTROL

(76) Inventor: Matthew Fagan, Middle Park (AU)

( * ) Notice: Subject to any disclaimer, the term of this patent is extended or adjusted under 35 U.S.C. 154(b) by 1624 days.

(21) Appl. No.: 12/485,606

(22) Filed: Jun. 16, 2009

(65) Prior Publication Data

US 2009/0312862 A1    Dec. 17, 2009

Related U.S. Application Data

(60) Provisional application No. 61/073,323, filed on Jun. 17, 2008.

(51) Int. Cl.
*B23K 10/00* (2006.01)
*B23K 26/04* (2014.01)
*B23K 26/38* (2014.01)

(52) U.S. Cl.
CPC ........... *B23K 10/006* (2013.01); *B23K 26/046* (2013.01); *B23K 26/048* (2013.01); *B23K 26/38* (2013.01)

(58) Field of Classification Search
CPC ..... B23K 10/006; B23K 26/048; B23K 26/38; B23K 26/046; B23P 23/00
USPC ....... 700/160, 186, 192; 219/121.39, 121.44, 219/121.54, 121.46, 121.55, 121.57
See application file for complete search history.

(56) References Cited

U.S. PATENT DOCUMENTS 3,581,045 A *   5/1971 Panschow et al. ........ 219/69.16
6,128,546 A    10/2000 Basista et al.
6,222,154 B1 *  4/2001 Yamaguchi et al. ..... 219/121.39
6,359,251 B1    3/2002 Picard et al.
6,388,227 B1 *  5/2002 Dykhno et al. ............ 219/121.6
6,609,044 B1    8/2003 Basista et al.
7,469,620 B2   12/2008 Fagan
8,010,224 B2 *  8/2011 Yamaguchi et al. .......... 700/173

(Continued)

FOREIGN PATENT DOCUMENTS

EP    1342526       9/2003
JP    11156550 A  *  6/1999 ............. B23K 10/00

OTHER PUBLICATIONS

Suh et al.: "Contouring performance measurement and evaluation of NC machine controller for virtual machining CAM system", International Journal of Advanced Manufacturing Technology, Springer-Verlag UK, vol. 16, No. 4, pp. 271-276.*

(Continued)

*Primary Examiner* — Kenneth M Lo
*Assistant Examiner* — Jason Lin
(74) *Attorney, Agent, or Firm* — Lathrop & Gage LLP

(57) ABSTRACT

A method for controlling a height of a cutting torch, includes loading a workpiece onto a numerical control machine, scanning the workpiece with a scanning device at a plurality of discrete points on an upper surface of the workpiece, measuring an X-, a Y-, and a Z-coordinate for each respective one of the scanned discrete points, where X and Y define a plane substantially parallel to the loaded workpiece and Z represents a distance between the upper surface and the scanning device at a respective discrete point, storing the measured XYZ coordinates from each of the scanned discrete points into a data set, mathematically fitting the stored data set to a smooth surface representative of the upper surface of the loaded workpiece, and cutting the workpiece along a cutting path programmed into the numerical control machine, while controlling the cutting torch height to correspond to the representative smooth surface.

16 Claims, 9 Drawing Sheets

(56) References Cited

U.S. PATENT DOCUMENTS

| | | | |
|---|---|---|---|
| 2003/0208296 A1* | 11/2003 | Brisson | A61B 19/20 700/117 |
| 2005/0240311 A1* | 10/2005 | Rabitz | 700/266 |
| 2007/0101310 A1* | 5/2007 | Stirniman | G03F 1/144 716/53 |
| 2008/0011728 A1* | 1/2008 | Peters et al. | 219/130.5 |
| 2008/0185368 A1 | 8/2008 | Fagan | |
| 2008/0249733 A1* | 10/2008 | Garg et al. | 702/97 |
| 2009/0108792 A1 | 4/2009 | Fagan | |

OTHER PUBLICATIONS

File History of European Patent No. 1563940, issued Oct. 8, 2008, dated Nov. 12, 2004 through Aug. 12, 2009, 290 pages.
File History of European Patent Application No. 07025249.9, filed Dec. 30, 2007, date Dec. 30, 2007 through Jun. 18, 2009, 211 pages.
File History of U.S. Appl. No. 10/892,634, now U.S. Pat. No. 7,469,620, dated Dec. 8, 2006 through Sep. 25, 2008, 100 pages.

* cited by examiner

METHODS AND SYSTEMS FOR PREDICTIVE TORCH HEIGHT CONTROL

CROSS-REFERENCE TO RELATED APPLICATIONS

This application is related to and claims the benefit of U.S. Provisional Patent Application No. 61/073,323, filed on Jun. 17, 2008, and entitled "Method And System For Predictive Torch Height Control", the entire contents of which are incorporated herein by reference.

FIELD OF THE INVENTION

The present application relates to the field of part-cutting technology, and more particularly to the field of cutting parts from metal sheets or plates by controlling cutting torch height. The present application can be applied to cutting of flat metal plates and sheets, and also to control beveling systems where torches cut at an angle other than vertical to a part's surface.

BACKGROUND OF THE INVENTION

Referring to FIG. 1, a Numerical Control machine, or NC machine, is a cutting machine with a numerical control unit 150 that guides a path of a cutting tool (e.g., a cutting torch 125), above a bed 140 on which a generally flat sheet or plate 160 rests. Generally, NC machines cut a series of shaped parts from the sheet/plate 160 with a vertical torch.

Cutting with an NC machine is controlled by an NC program which resides in NC control unit 150. This NC program is typically a user-readable list of coordinates and commands using the letters A-Z and the numbers 0-10. Additional characters usually include a period ("."), positive ("+"), and/or negative ("−") signs. Orthogonal planar axes of the NC machine are usually designated by the letters "X" and "Y," although in some NC languages the designation is implied by position in the control line of text, the first being "X" and the second number being "Y." Such a list of movements and actions is known as an NC program. NC machines are used extensively in manufacturing industries, and typically follow a version of Electronic Industry Standard 273 known as Word Address, or the equivalent European Standard known as ESSI, as defined by International Standards Organization as ISO 6582, and which uses only numbers 0-9, signs "+" and "−," and implicitly reads the X and Y axes through a position in an expression such as +100+200, where the X movement is 10 mm and the Y movement is 20 mm.

Some NC machines, such as in embodiments discussed below, are known as "profiling" machines, which cut shapes from a flat sheet or plate material with torches 125, which can include oxy-acetylene, plasma, laser, and/or water jet.

Torch 125 is generally moved vertically using a motorized Torch Height Control (THC) 130 mounted on a gantry 135. The THC 130 allows the NC machine to cut materials of various thicknesses by retracting and lowering torch 125 to the material 160 to be cut. Generally, while cutting shapes in two dimensions, it is important to control the height of torch 125 above material 160.

Machines such as that shown in FIG. 1 are typically engineered to be flat and horizontal. Bed 140 on which the plate/workpiece lies is also expected to be flat, although bed 140 tends to become damaged over time with use. The plate is considered substantially close to "flat" originally, and can be further flattened before cutting if required. The rails on which gantry 135 runs are also supposed to be substantially flat and horizontal. Thus, all surfaces are expected, in principle, to be near flat, horizontal, and parallel from the start of operations. In theory, it would thus be conceivable that a clean new machine with a flat bed should be capable of cutting a plate without using height control feedback. In reality, height control feedback can be avoided only for short distance cuts. The risk of the cutting head colliding with the plate is much too high in practice for large parts and long distance cuts.

When cutting parts with beveled edges, on the other hand, maintenance of the height of the head becomes more critical than when edges of a cut part are not beveled. A torch height 210 is illustrated in FIG. 2, for example. Laser torches are commonly used to cut thinner materials, in the thickness range 0-10 mm, for example, although some laser torches are used to cut steel up to 50 mm thick. Torch height 210, or the torch-to-plate cutting distance, is typically not more than a few millimeters when using a laser torch. Plasma torches, on the other hand, are commonly used to cut thicker materials, in the thickness range 0-50 mm, and sometimes as thick as 160 mm. The torch-to-plate distance with a plasma torch is typically 4-10 mm. Oxy-acetylene torches and water jets are commonly used to cut materials as thick as 400 mm, with torch-to-plate distances in the order of approximately 20 mm.

For systems where a vertical torch is used to cut a sheet or plate, it is important to set and maintain torch height 210 at an optimum point above the material, which can be done by a Torch Height Control (THC) system 220, together with a motor 200 (best seen in FIG. 2), which raises and drops a torch 205 as required.

Another use for THC system 220 is to avoid collisions with the plate material, or pieces cut from the material that may have moved or broken from it. At times, even the scrap plate skeleton itself can spring or bend and hit the torch 205 as it moves across the material. Height control thus can be used both to prevent damage to the torch, and to optimize the height of the torch, and therefore the quality of the cut.

The torch height 210 is maintained by a separate feedback loop independently of NC control (CNC) 260 and programmable logic controller (PLC) 270, which generates X axis 280 and Y axis 290. THC system 220 works on measuring torch height 210 during cutting of the plate or material. When plasma cutting, for example (as shown in FIG. 2), torch height 210—while cutting—is maintained by measuring a voltage of a plasma arc that is directly related to its arc length. The voltage is supplied by a power supply 230 to THC system 220, which in turn drives motor 200 to adjust the height of torch 205 to keep both the voltage and torch height 210 within desired bounds. This feedback system is used almost universally for plasma torches, and is independent of NC control (CNC) 260 during operation. Such technology is commonly known as Automatic Voltage Control (AVC), and removes a need for an independent height sensing device. AVC systems are convenient for plasma arc cutting because interference between sensitive electronics in a sensor used in a different measurement system, in the presence of a plasma arc, might be rendered ineffective. Other continuous height sensors include lasers, acoustic devices, capacitive ring sensors, and/or various plate riders that drag or roll over the plate surface.

The separate and independent height control loop between a sensor and the THC 220 allows NC control 260 to concentrate processing power on other functions that are of higher priority, which can be significant when processing power is limited. Movement of torch 205 to maintain torch height 210 is in principle a consequence only of a bent plate, or that the plate and machine are not both horizontal and perfectly parallel to each other. For this reason, torch height 210 is to be independent of the conventional NC program, which is only concerned with XY movement of a vertical torch 205, and not at all with movement in the vertical or Z direction. Thus, communication between NC control 260 and THC 220 is usually restricted to general functions such as "Raise," "Lower," "Height Control On," and "Height Control Off." In most known profiling machines, NC control 260 does not directly control the exact height, Z, during cutting.

Conventional height control systems tend to work adequately for simple vertical cutting (i.e., where a cutting torch is aligned perpendicular to the workpiece), though the height of the torch relative to the workpiece may vary within a considerable distance range. For plasma cutting, the variance may typically be +/−3 mm. For vertical torch cutting, the variance tends to only affects the quality of the cut, but will have little effect on the shape of the part that is cut.

Mechanical devices that physically contact the plate for cutting are generally more accurate than AVC devices, but mechanical devices are known to experience problems when their cutting heads run over previously cut paths, or fall into holes in the workpiece. Such difficulties can require very complex NC programs to avoid these obstacles to efficient cutting. Ball bearing mechanical feet, for example, can become clogged with dirt or metal from the surface of or waste from the workpiece.

The conventional relationship between an arc voltage (e.g., sensed arc voltage 240) for plasma cutting and the respective torch height is known to be only a general range, and not a specific value, because the AVC arc is unstable at the start of cutting, and even when the arc "stabilizes," the required voltage for the AVC must still be averaged because of continual variations in the arc for reasons other than variation of torch height 210. AVC is also known to be less useful for cutting small holes and tight corners, because the typical fluctuations in arc conditions can produce unfavorable torch height changes, thereby resulting in lower quality cuts.

One significant drawback to using conventional feedback THC systems, such as that shown in FIG. 2, is that when torch 205 traverses a hole in the material, torch 205 can "dive" (i.e., drop into the hole). The dive results from the THC system are unable to distinguish between the hole versus a simple variation in the height of the material of the workpiece. Conventional systems deal with such problems by turning off the height control in the NC program at various points in the programmed cutting path, for example, such as when torch 205 moves near previously cut holes or paths, or when cutting into scrap material of the workpiece which may have tilted or dropped. Torch dives can result in poor quality cutting, and also in damaging collisions between the torch and the workpiece material.

Torch dives are difficult to avoid because the cutting path of a part will invariably encounter a hole at least near the exit from the cutting path to drop the cut part from the workpiece material. Similarly, a void in the workpiece can also be encountered in the cutting path when a piece of adjacent scrap material may have already fallen out of the workpiece from an earlier cut. Accordingly, many NC programs further rely on generating complex machine paths to avoid traversing previously cut holes, or else the programs force full torch lifts after every part or hole is cut. Because torch lifts can slow the cutting process significantly, full torch lifts for each part or hole can add greatly to the time needed to cut and process a nest of parts, or to traverse a pattern of holes in one part. As the variations in plate shape are not known before cutting, such conventional slowing of processes is performed even when the workpiece material is, for all intentions, reasonably flat, and when THC variations are largely irrelevant to vertical cuts.

Turning now to FIG. 3, when cutting is not only vertical, some more complex machines allow a torch 305 (e.g., torches 125, 205 of FIGS. 1, 2, respectively) to be tilted under program control to create a beveled edge to a cut part. Multiple cutting passes on a workpiece, each at a different tilt angle to the torch, as shown in FIG. 4, can create multiple bevels to an edge of the part. Beveling is of great commercial interest because most cut materials have to be subsequently welded to other parts, which in the art is typically a slow, difficult, messy, and expensive manual process. The welding process though, can be simplified and made more efficient by first performing the beveling operations on the part during the cutting process, as best illustrated in FIG. 4.

In edge beveling operations, however, the greatest problems are known to occur with independent THC systems that are based on continual feedback from height sensors while cutting. Referring back to FIG. 3, the present inventor has discovered that conventional height control systems move the torch only in a vertical direction 300, in order to maintain an arc length 310, rather than along the axis 340 of torch 305. Therefore, any movement in the vertical direction 300 without concurrent associated plate/workpiece movement will change a desired intersection point 320 for cutting to a different, and incorrect, point 330 on the plate surface (i.e., at intersection point 320). When such a shift occurs, the angle of torch 305 will still be correct, but the position of the cut on the plate/workpiece will be incorrect. As an example, at 45 degrees of inclination to torch 305, a vertical displacement of 1 mm in direction 300 (to maintain arc length 310) will result in a horizontal displacement of 1 mm on the workpiece between points 320 and 330.

Accordingly, conventional beveling machines experience unplanned vertical movement of the torch, i.e., other than for a variation of torch-to-plate distance 210 (see FIG. 2), resulting in incorrect cuts of the outline of respective parts. For example, in AVC systems, the arc length/voltage 310, which does roughly vary with torch height, is not an accurate absolute measure of torch height. Also, the arc length/voltage 310 is affected by many other factors, including the absence of previously removed material, the proximity to previous cuts, or other factors related to normal variation arc conditions that are unrelated to torch height. These factors are not considered to cause problems for vertical cutting applications, but will certainly lead to significant accuracy problems in bevel cutting, as point 330 is not the desired point 320.

Referring again to FIG. 4, bevel cutting for weld preparation can involve one, two, three, or more passes of the torch. An example of three-pass beveling is shown represented by an under cut 400, a center cut 410, and a top cut 420, which all may be performed in this respective order. A "K"-shaped bevel preparation is shown, and can be used for subsequent welding of the cut part from plate. For the cut part to be usable, the tolerance of dimensions 430, 440, and 450 should be within +/−1 mm. If, however, the THC varies within the typical +/−3 mm, as discussed above, such tolerances are impossible to achieve.

Because of such difficulties in achieving desired dimension tolerances for beveled parts, the use of NC flame, waterjet, and plasma machines for preparation of weld-ready parts has been historically unacceptable. These types of machines thus represent less than 1% of all machines sold. As the present inventor has discovered, plasma machines being used for multi-pass weld preparation are rare, and even more rarely work satisfactorily, even for a single-pass beveling operation. Attempts with such machines to do any cutting other than vertical are often abandoned. The largest manufacturers of such machines have attempted to produce multi-pass bevel machines for many years, but most have abandoned AVC based systems as unworkable.

As discussed above, for theoretically flat machine beds and plates, short cuts can be reasonably performed without requiring height control feedback. However, in practice, limiting the cuts to only short distances and/or small workpieces is not practical or economically feasible.

An alternative approach that has been attempted is the measurement of the profile of the plate after it is loaded, but before it is cut. The Messer Greisham company, for example, is known to have implemented a concept of prior measurement of particular XYZ points on a workpiece before cutting the workpiece. In the Messer Greisham approach, commands are inserted in the NC program to move the cutting head of the torch to predetermined points along an exact path to be cut, but prior to the actual cutting itself. The voltage is measured at each of particular XY points on the workpiece, and stored in the memory of the NC control 150 for each measured XY point. When the machine again reaches these same XY points during cutting, the previously measured AVC voltage is recalled in the NC program to approximate a height value from the recalled voltage value. These XY points are chosen by the NC programmer during creation of the NC program.

According to the Messer Greisham approach, the XY points must be chosen by the creator of the NC program prior to cutting, and then embedded in the NC program. These points must then be explicitly recalled during cutting, and at the same respective locations. The approach thus requires skilled judgment by the programmer on general principles, without prior knowledge of the shape of the plate workpiece. In a multi-pass situation, where the paths are near parallel but slightly different, the required skill of the programmer increases substantially. A typical programmer is not generally considered capable of programming the NC machine to perform within required tolerances. The coding of the NC program must also be completed before nesting occurs, which factor is a significant impediment to the nesting process itself. Substantial changes must be made to the NC control to accommodate geometric transformations of individual bevels as part of the program. The approach uses samples of the arc voltage measured at specific points, which, as noted above, is not a direct measure of torch height.

While the Messer Greisham approach can be better than the dynamic feedback approach in beveling operations, because the Z height is theoretically "correct" at the start of each machine movement, a problem still occurs where the approach of the torch is based on the assumption that Z varies linearly between the points that are actually measured in advance of the cutting operation. As discussed above, many factors can drastically reduce the feasibility of such an assumption. When a workpiece plate is substantially flat within desired tolerances, and the flatness is not significantly altered during the cutting process, the Messer Greisham assumption can be sufficient. However, the present inventor has discovered that, in practice, when long or curved cuts are made, the flatness and parallelism of the respective plate, bed, and machine will vary on the order of 10 mm, and over a run of only a few meters. Accordingly, the Messer Greisham approach can create dangerous risks to the machine parts, since distance between the workpiece and the cutting head, for example, is not a straight line over the entire cutting, thereby resulting in a significant risk of a collision between plate and torch.

The Messer Greisham approach further requires the use of special codes in the NC program, which makes the programming nonstandard, thereby requiring additional extensions to most standard NC languages, especially to the ESSI code discussed above, as well as additional costs and resources to implement the approach effectively. The Messer Greisham approach also does not appear to use a directly programmable Z axis (see element 745 in FIG. 7, discussed further below), but instead simply utilizes the arc voltage that was previously recorded from the NC program (see element 260, FIG. 2) to a traditional THC (see element 220, FIG. 2). The Messer Greisham approach uses no element of prediction; it instead measures and remembers specific voltages around the path to be cut.

SUMMARY OF THE INVENTION

Described herein are methods and systems for keeping torch height precisely maintained above the material to be cut by prior measurement and dynamic prediction. A preliminary and accurate measurement of a series of heights at points across the plate to be cut is made using a height sensor and the programmable behavior of the machine.

In an embodiment, a method adjusts a height of a cutting torch, mounted on a gantry of a numerical control cutting machine, with respect to a plate mounted on a cutting bed of the numerical control cutting machine. The cutting torch is positioned, using the gantry, at each of a plurality of discrete XY points on the plate in an XY plane. A distance between a detection device mounted on the cutting torch and an upper surface of the plate is measured at each of the XY points to form a set of XYZ contour points; the measured distance being along a Z axis that is substantially perpendicular to the XY plane. A surface model based upon the set of XYZ contour points is generated within a surface prediction module, and the height of the cutting torch is controlled while cutting the plate based upon a desired height and the surface model, such that the cutting torch is maintained at the desired height above the upper surface while cutting the plate.

In another embodiment, a numerical control cutting machine has predictive torch height control, and includes a cutting bed for supporting a plate to be cut, a gantry for traversing the cutting bed in an XY plane substantially parallel to the cutting bed, a cutting torch mounted on the gantry and having vertical positioning in a Z axis that is substantially perpendicular to the XY plane, a controller for controlling the gantry to move the cutting torch along a cutting path, and a surface prediction module for predicting the height of an upper surface of the plate based upon a surface model of the upper surface and for adjusting the vertical position of the cutting torch relative to the upper surface such that the cutting torch is substantially maintained at a desired height above the upper surface while cutting the plate.

DETAILED DESCRIPTION OF THE INVENTION

Figure 7:
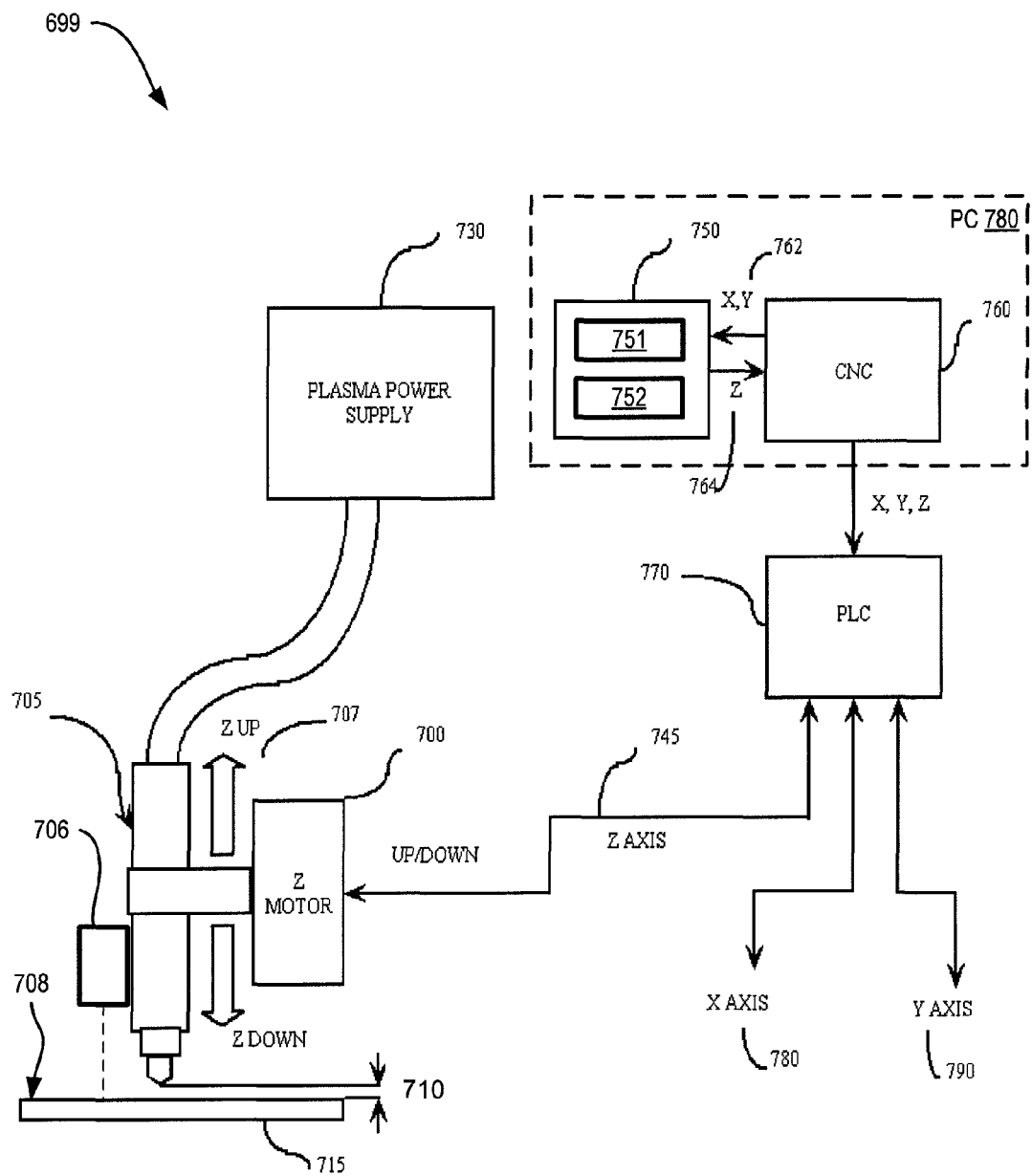
FIG. 7 illustrates one exemplary predictive torch height control system that uses a surface prediction module in conjunction with direct Z-axis torch movement, according to an embodiment.

FIG. 7 shows one exemplary predictive torch height control system for a numerical control (NC) machine 699 that cuts parts out of a plate 715. Plate 715 may also be referred to as a workpiece, hereinafter. NC machine 699 includes a computer numerical controller (CNC) 760, a programmable logic controller (PLC) 770, a Z axis motor 700 and a plasma cutting torch 705 powered from a plasma power supply 730. Although shown as a plasma cutting torch and supply in this example, cutting torch 705 and plasma power supply 730 may represent any type of cutting torch known in the art. As shown, CNC 760 sends X, Y and Z coordinates to PLC 770, which in turn outputs X axis 780 and Y axis 790 values to control horizontal position of cutting torch 705 (i.e., control of a gantry carrying cutting torch 705) and outputs Z axis value 745 to Z axis motor 700 for controlling a vertical movement 707 of cutting torch 705.

NC machine 699 also includes a surface prediction module 750 that interfaces with CNC 760 to provide height information Z 764, for a given X Y position 762, to CNC 760 based upon a surface model 751 of plate 715 derived from XYZ contour points (e.g., XYZ contour points 500, described below with respect to FIG. 5b). Since surface prediction module 750 models a surface 708 of plate 715, surface prediction module 750 may determine height information Z 764 for any X Y position 762. More specifically, surface model 751, within surface prediction module 750, more closely resembles the surface topology of plate 715 than simple linear interpolation between cutting start points. Surface prediction module 750 may utilize one or more methods (e.g., Bezier surface, non-uniform rational B-spline (NURBS), Gorden surfaces, and Coon surfaces) of modeling the surface of plate 715.

Surface prediction module 750 may be implemented within a personal computer (PC) based controller 780, as shown hosting CNC 760 within NC machine 699.

In an embodiment, where NC machine 699 does not dynamically modify (i.e., CNC 760 does not programmatically control) height of cutting torch 705 based upon a user NC program, cutting torch 705 may be preset to have a desired height (e.g., 10.0 mm) above cutting plate 715 on NC machine 699. Surface prediction module 750 models the surface of plate 715, such that predicted height information Z 764 represents an absolute height value for cutting torch 705. That is, surface prediction module 750 determines a Z axis value 745 based upon X Y position 762 such that Z axis motor 700 is controlled to maintain height of cutting torch 705 substantially constant above the surface of plate 715. In other words, surface prediction module 750 models the surface that cutting torch 705 follows to maintain a substantially constant height above the surface of plate 715.

Consider an example of operation, where at X Y position '1752', '1584', surface 708 of plate 715 is 3.7 mm higher than a reference point, stored as a reference height measurement 752, of plate 715 where height of torch 705 is 10.0 mm. Although height of torch is not varied by CNC 760, cutting torch 705, when positioned at X Y position '1752', '1584', is only 6.3 mm above surface 708. Since surface model 751 predicts variation in height of surface 708 relative to torch 705, surface prediction module 750 may return a Z axis value (e.g., height information Z 764) that allows CNC 760 to output a corrected Z axis value 745 to position cutting torch 705 at the correct height for X, Y position 762.

In an embodiment, surface model 751 models a variation in surface 708 from a flat surface at the desired torch height. Thus, height information Z 764 determined from surface model 751 represents Z axis value 745 directly. In an alternate embodiment, surface model 751 is generated based only upon variation of surface 708, and thus generates height information Z 764 as an offset that is added to, or subtracted from, a desired height control value. Other similar methods of determining Z axis value 745 from surface model 751 and height information Z 764 may be used without departing from the scope hereof.

The Messer Greisham approach, discussed above, which appears only to use conventional AVC to control the height of the torch by recalling a previously measured voltage V at specific predetermined points along the cutting path, thereby only approximating height measurement. On the other hand, surface prediction module 750 uses exact distance measurements and may generate height control values (e.g., height information Z 764) for any X, Y position on plate 715. Although arc voltage is generally related to torch height in ideal conditions, this approach is not as reliable or accurate as using a measured value of height variation. Particularly, since other factors, such as material removed by previous cuts, significantly interfere with the accuracy of using voltage measurement to control torch height. In contrast, surface prediction module 750 and surface model 751 allows NC machine 699 to control cutting torch 705 to be substantially at a desired height above surface 708 of plate 715.

Figure 5A:
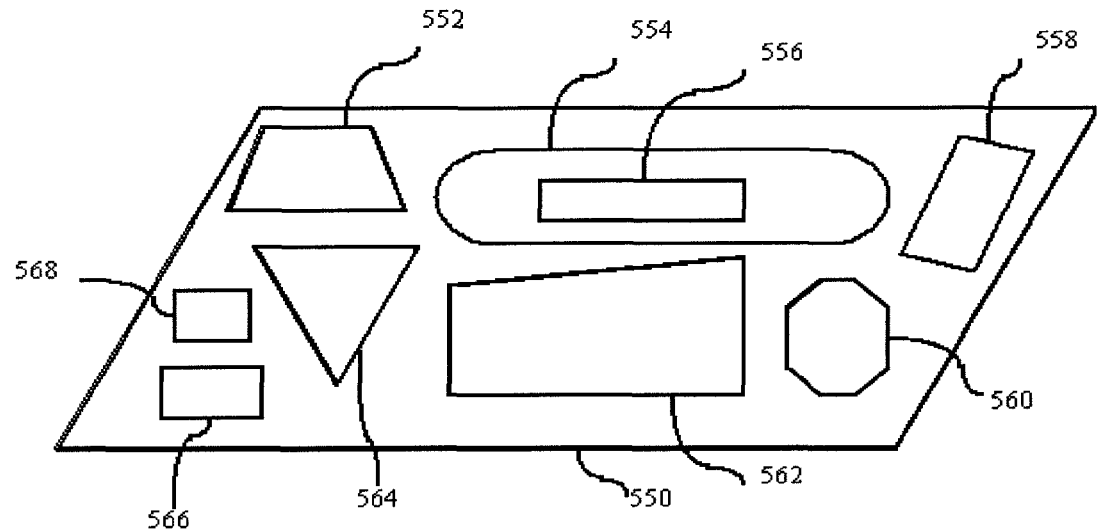
FIG. 5a shows a sample cutting path of parts to be cut from the workpiece.

FIG. 5a illustrates exemplary nested parts 552, 554, 558, 560, 562, 564, 566, and 568 to be cut from a plate 550 (workpiece). Plate 550 may represent plate 715 of FIG. 7. Certain of these nested parts, such as part 554, may include one or more holes, such as hole 556. Prior to cutting, plate 550 is loaded onto NC machine 699, FIG. 7. After loading, but before cutting, as shown in FIG. 5b, a plurality of XYZ contour points 500, unrelated to cutting paths of nested parts 552, 554, 558, 560, 562, 564, 566, and 568, are measured across a top surface of plate 550. Although thirty XYZ contour points 500(1)-500(30) are shown in this example, more or fewer contour points may be used without departing from the scope hereof.

XYZ contour points 500 may be measured automatically, for example as a preliminary function of NC machine 699, FIG. 7. Quite unlike the Messer Greisham approach, described above, XYZ contour points 500 are not based upon points in the NC program cutting paths of nested parts 552, 554, 558, 560, 562, 564, 566, and 568, but may instead be a regular pattern of sample points to provide fair coverage of the surface of plate 550, as shown in FIG. 5b. By modeling the surface of plate 550 based upon XYZ contour points 500, prediction of the vertical height Z of plate 550 at any arbitrary point on plate 550 may be mathematically determined. Furthermore, unlike the Messer Greisham approach, no change to the NC program for cutting out nested parts 552, 554, 558, 560, 562, 564, 566, and 568 is required.

In a preferred embodiment, height information of XYZ contour points 500 is measured using a height measuring device having a verifiable accuracy in the order of 0.001 inches, though other devices and accuracies may also be used without departing from the scope hereof. In one example of operation, after plate 550 is loaded on a cutting bed of NC machine 699, FIG. 7, CNC 760 controls the gantry of NC machine 699 to scan plate 550 in a series of passes to generate XYZ contour points 500 that cover the surface of plate 550, as shown. At each contour measuring point, measuring device 706, e.g., one or more of a laser, an acoustic, and a mechanical sensor, measures the distance from an upper surface of plate 550 to the tip of cutting torch 705 as a Z value, and stores the respective XYZ contour point 500 (XY location on the plate with the measured Z height at that location) in a memory of CNC 760 and/or surface prediction module 750. In another embodiment, Z height is measured for each contour point 500 with respect to a reference point on the surface of plate 550. These measurements may be performed very accurately, even when NC machine 699 moves rapidly between measurement points. Further, since these measurements are made by movements of the actual NC machine, such that differences between the tip of cutting torch 705 and plate 550, 715 are measured, height variation of cutting torch 705 caused by NC machine 699 itself are also taken into account.

Figure 5B:
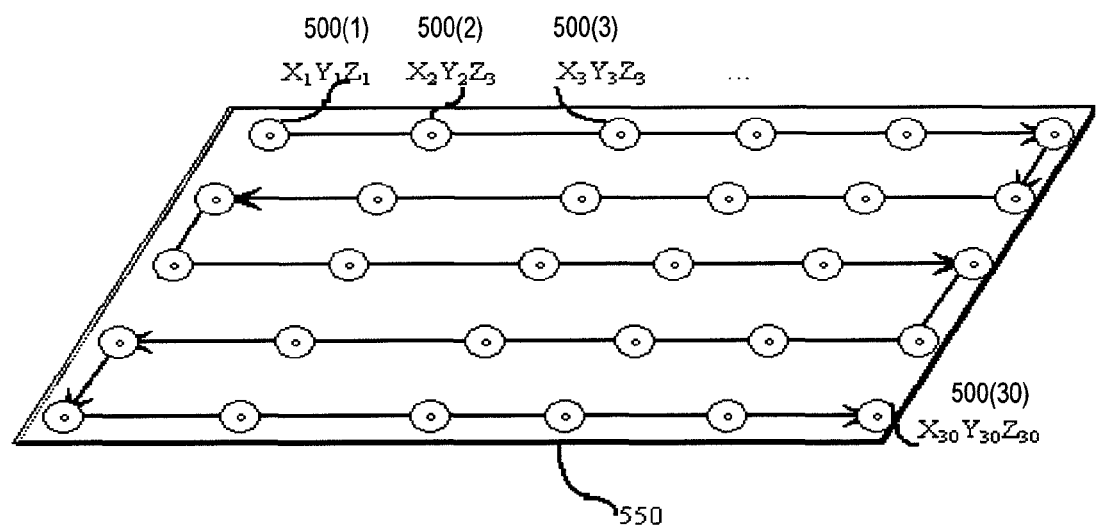
FIG. 5b shows a sample scanning path to collect XYZ points prior to a cutting.

FIG. 5*b* shows thirty XYZ contour points 500, not all numbered for clarity of illustration. However, these points are not required to be entered into the actually cutting program for nested parts 552, 554, 558, 560, 562, 564, 566, and 568. That is, the measurement program, resultant measurements and contour points remain separate from the NC program for cutting out nested parts 552, 554, 558, 560, 562, 564, 566, and 568.

The flatter the surface of plate 550, 715, the fewer measurement points needed to accurately predict/model the surface topology. This process can also be automated with the assistance of any one of a number of known height measurement devices of various technologies in the art. The measurement process is further expedited when the plate is clean and undamaged by cutting. Typically, thirty XYZ contour points may be measured in between one to two minutes on a modern NC machine, and faster measurements may be possible. XYZ contour points 500 may be stored in a permanent and/or non-volatile storage to prevent data loss in the event that power is interrupted to the NC machine.

Figure 6:
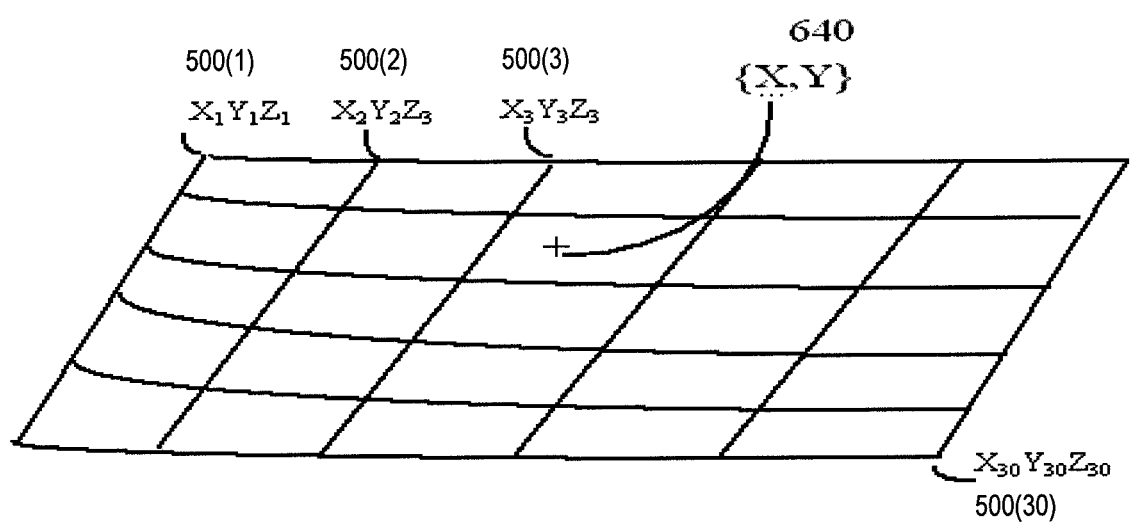
FIG. 6 shows a fitting of a surface to a collection of XYZ points to predict Z at an arbitrary point.

Once measured, XYZ contour points 500 (e.g., $X_1Y_1Y_1$ through $X_{30}Y_{30}Z_{30}$) may be mathematically fitted to a smooth surface within surface prediction module 750. Surface prediction module 750 may represents a program or software module that runs within the environment of CNC 760. By modeling a substantially continuous, unbroken, and smooth surface—which should be nearly flat in most cases—based upon XYZ contour points 500, any point on that surface may be predicted with high accuracy and speed. The process of fitting smooth surfaces and/or curves to a series of points is known in the art of mathematics and is not explained in further detail herein, though an indicative sketch of such a fitting is shown in FIG. 6. Point 640 is not one of the measured XYZ contour points 500, but is an arbitrary XY point on the modeled surface at which a predictive Z value is sought (point 640 may be a point on the cutting path of a nested part). The predicted Z value, from surface model 751, for point 640 may represent the actual height of the corresponding point on the surface of plate 550, 715 very precisely. PC based controller 780 is capable of performing such calculations within a few milliseconds.

For long cuts (e.g., a long cut deriving from a single NC command, such as between two distant points), Z axis values may be calculated and output regularly during execution of the cut. For example, interpolation to obtain X Y points on a straight line cut between two points may be used to derive Z values that may be applied during the cut. In an embodiment, CNC 760 may include a first PC card to control XY movement, and a second PC card to control Z, or height, movement.

It is important to note that linear interpolation to determine Z axis movement between discrete points is unreliable, particularly since the surface topology of the plate is independent of the NC program. Where a cut is defined by sets of coordinates, $X_1Y_1$ and $X_2Y_2$, and a predefined contour of points, lines, and arcs, Z axis variation is arbitrary, and caused solely by the lack of flatness and parallelism of the bed, plate, and/or NC machine. A linear interpolation of Z movement over the cutting distance may in many cases be a valid first order approximation, but is not likely to be correct over a long cutting movement unless a very large and prohibitive number of points is first obtained.

An example of the fallacy of linear interpolation of Z height between start and end points of a programmed movement is illustrated when a full circle (not shown) is cut. A full circle is generally programmed as a single block of NC and corresponds to a single movement. Such a circle can be very large, in fact as big as the whole plate. Using only linear interpolation, the variation in Z height would be zero between a start point and an end point on the circle, as they are the same point. The interpolation from the start point to the end point (if no additional points were measured therebetween) would therefore find "no Z variation" around the circle, which would be a clearly wrong result unless the plate were perfectly flat. The Messer Greisham approach is thus only a compromise that still uses only AVC, but with an occasional reset to the voltage according to previous voltage measurements (not actual height) at previously determined points on the cutting path.

In contrast, with NC machine 699, during the execution of a specific XY movement between point $X_1Y_1$ and point $X_2Y_2$, for example, the Z height is calculated from the modeled surface of plate 715 at regular time and/or distance intervals, such that CNC 760 may adjust height of cutting torch 705 based upon measured topology of plate 715. For example, at every XY point on the cutting path, the respective Z height may be accurately predicted—even before cutting commences.

In an embodiment, during the measurement of the surface topology of plate 715, if a bend in the plate is detected, distance between measurement points may be reduced to better model the bend; i.e., where there is greater topology variation in the plate, more (denser) measurement points may be made to improve modeling and height prediction. It is again important to point out that a desired point or points, such as point 640 (FIG. 6), does not have to fall directly on a measured XYZ contour point 500 (FIG. 5*b*). Surface prediction module 750 may continuously predict Z axis height values from surface model 751, as illustrated in FIG. 6.

Further, by measuring the topology of surface 708 using measurement device 706 mounted to cutting torch 708, variation in plate 715 and/or NC machine (e.g., the bed, the gantry, etc.) are automatically compensated for.

As discussed above, NC machine 699 may use one or more measuring devices 706, such as commercially available laser, acoustic, mechanical, and/or other height sensors that are known to generate a near-perfect Z measurement for the purposes of cutting with most plate cutting technologies, i.e., within the +/−0.01 mm range. NC machine 699 further advantageously utilizes modern PC-based numerical controllers, having processors running at approximately 2 Ghz, and with at least one floating point processor that can quickly perform the initial and demanding task of fitting a surface to a series of XYZ contour points within a few seconds. The present system can then, based on the measured XYZ contour points and modeled surface, use the numerical controllers during movement, and in real time, to perform a near-instantaneous lookup prediction of Z height at any given XY point, a feat which has been impossible for earlier NC controls. NC machine 699, using surface prediction module 750, allows height variation between the tip of cutting torch 705 and surface of plate 715 to be kept within +/−0.1 mm, thereby allowing high quality weld preparations using beveled multi-pass cutting movements.

While a significant advantage of various embodiments of the present systems and methods is the accurate prediction of plate height and improvement of torch height control during cutting, other advantages include the automatic determination of the plate shape and the effective elimination of problems associated with torch dives and cut quality for holes and corners. A still further advantage of various embodiments of the present system and methods is the continuing independence from the NC program itself, in that no change to the NC program is required to predict/obtain very accurate torch height values at all points on the plate. Therefore, the present systems and methods may result in better cut quality even for traditional vertical cutting, as a replacement for current torch height control feedback systems. The requirement to turn height control on and off during cutting also becomes unnecessary, and no modifications to the NC program, or extensions to the NC language, are required. Presently known programming languages, such as ESSI, can immediately utilize the present systems and methods without additional changes.

Figure 8:
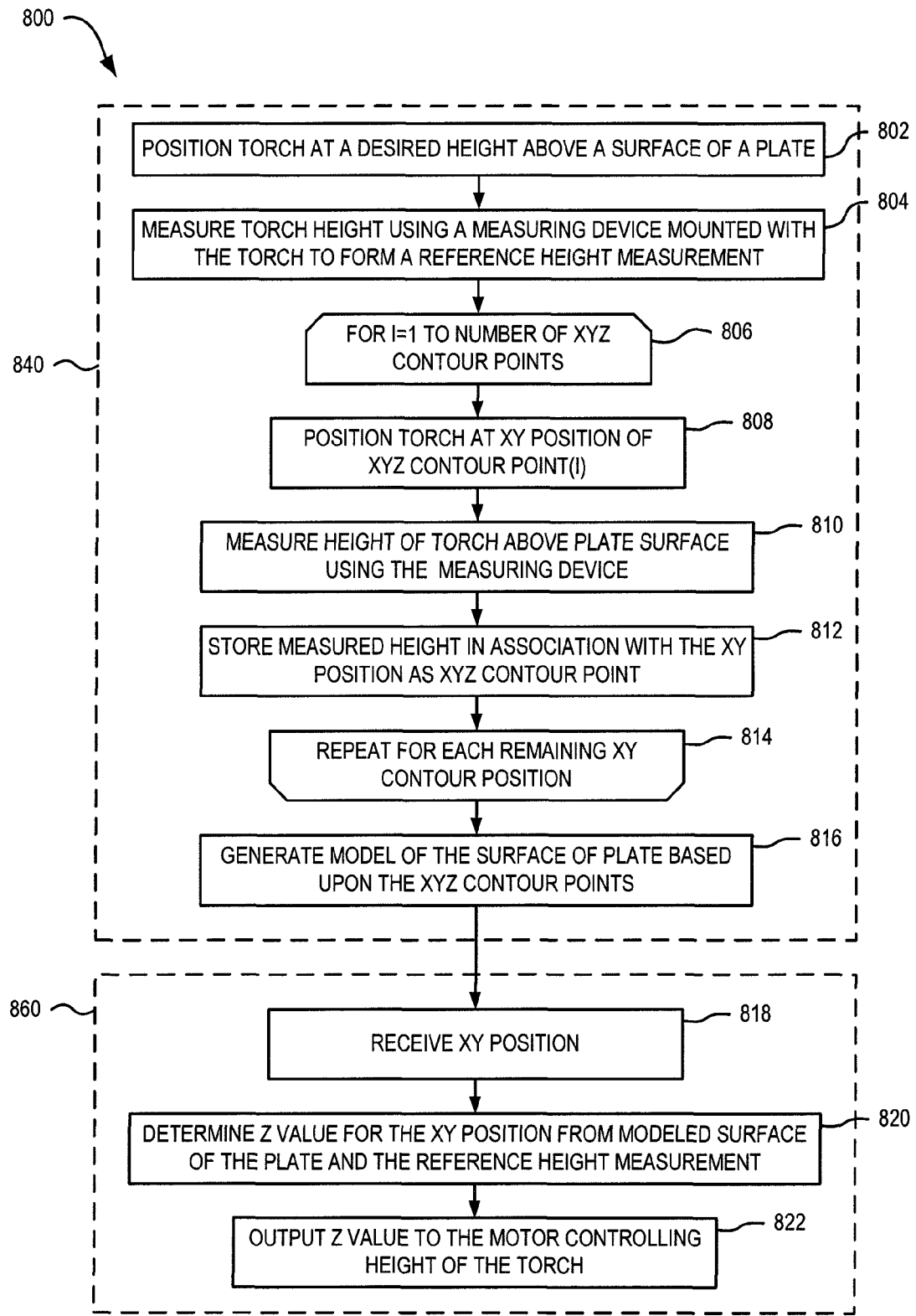
FIG. 8 is a flowchart illustrating one exemplary process for predictive torch height control.

FIG. 8 is a flowchart illustrating one exemplary process 800 for predictive torch height control. Steps 802 through 814 may be implemented within CNC 760 and steps 816 through 822 may be implemented within surface prediction module 750. Steps 804 through 816, shown within dashed outline 840, represent an initialization sequence that is performed for each plate (e.g., plate 715) loaded onto NC machine 699. Steps 818 through 822, shown within dashed outline 860, repeat for each of a plurality of XY positions used to control movement of torch 705 when cutting plate 715.

In step 802, process 800 positions a torch at a desired height above a surface of a plate. In one example of step 802, CNC 760 positions torch 705 above plate 715 and allows an operator to adjust torch 705 to be at a desired height above surface 708. In step 804, process 800 measures the torch height using a measuring device mounted with the torch. In one example of step 804, CNC 760 uses measuring device 706 to measure a distance of height 710 of torch 705 above surface 708 to form a reference height measurement.

Steps 806 and 814 represent the start and end points, respectively, of a loop where "I" iterates from 1 to the number of XYZ contour points and steps 808 through 812 repeat for each value of I. For example, steps 808 through 812 are repeated thirty times (I=1 . . . 30) for XYZ contour points 500. Within steps 806 through 814, height of torch 705 is not changed by CNC 760. That is, once set at the desired height, Z motor 700 is not used to vary height of torch 705 during steps 806 through 814 of process 800.

In step 808, process 800 positions the torch at the XY position defined by the $I^{th}$ point of the XYZ contour points. In one example of step 808, in a first iteration of the loop, "I" is one and CNC 760 positions torch 705 at $X_1, Y_1$ defined by XYZ contour points 500(1). In step 810, process 800 measures height of torch above plate surface using a measuring device mounted with the torch. In one example of step 810, measuring device 706, mounted with torch 705, measures a distance that is representative of the height of torch 705 above surface 708 at position $X_1, Y_1$. In step 812, process 800 stores the measured height in association with the XY position as XYZ contour point. In one example of step 812, CNC 760 stores the measured height of step 810 as a Z value within XYZ contour points 500(I).

Once height of torch 705 at each XY position of XYZ contour points 500 has been measured and stored, process 800 continues with step 816. In step 816, process 800 generates a model of the surface of the plate based upon the XYZ contour points. In one example of step 816, surface prediction module 750 generates model 751 representative of surface 708 of plate 715 based upon XYZ contour points 500.

In step 818, process 800 receives an XY position. In one example of step 818, surface prediction module 750 receives X,Y 762 from CNC 760. In step 820, process 800 determines a Z value, for the received XY position, from the modeled surface of the plate and the reference height measurement of step 804. In one example of step 820, surface prediction module 750 determines Z value 764 based upon surface model 751 and the reference height measurement of step 804. In step 822, process 800 outputs the determined Z value to the motor controlling height of the torch. In one example of step 822, surface prediction module 750 outputs Z value 764 to CNC 760, which sends it, together with the X, Y values 762, to PLC 770 where it is output to Z motor 700.

Figure 1:
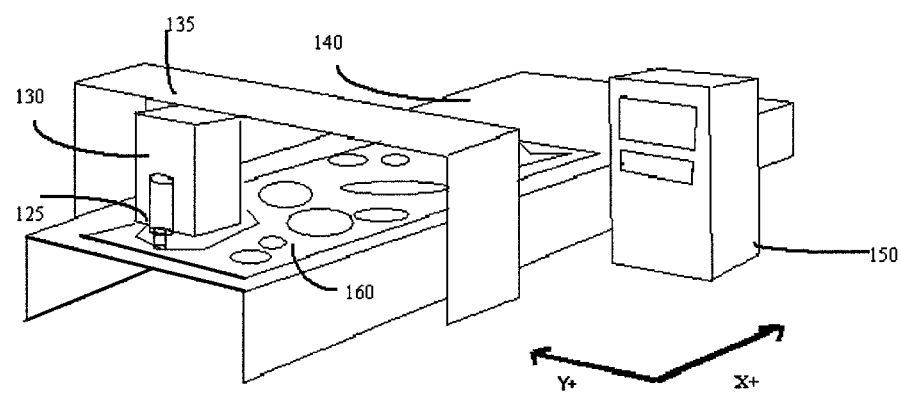
FIG. 1 illustrates a conventional numerical control part-cutting system.
Figure 2:
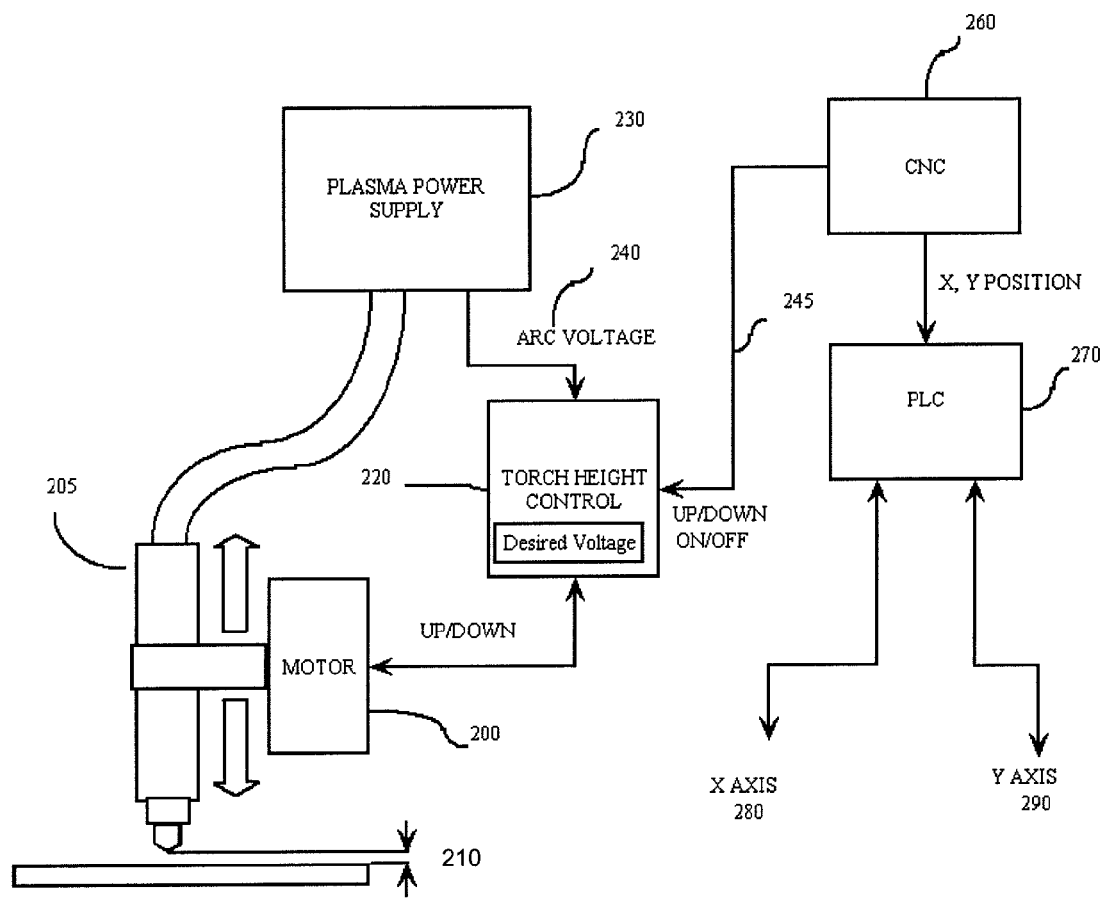
FIG. 2 shows a conventional height control system using Automatic Voltage Control to drive torch height.
Figure 3:
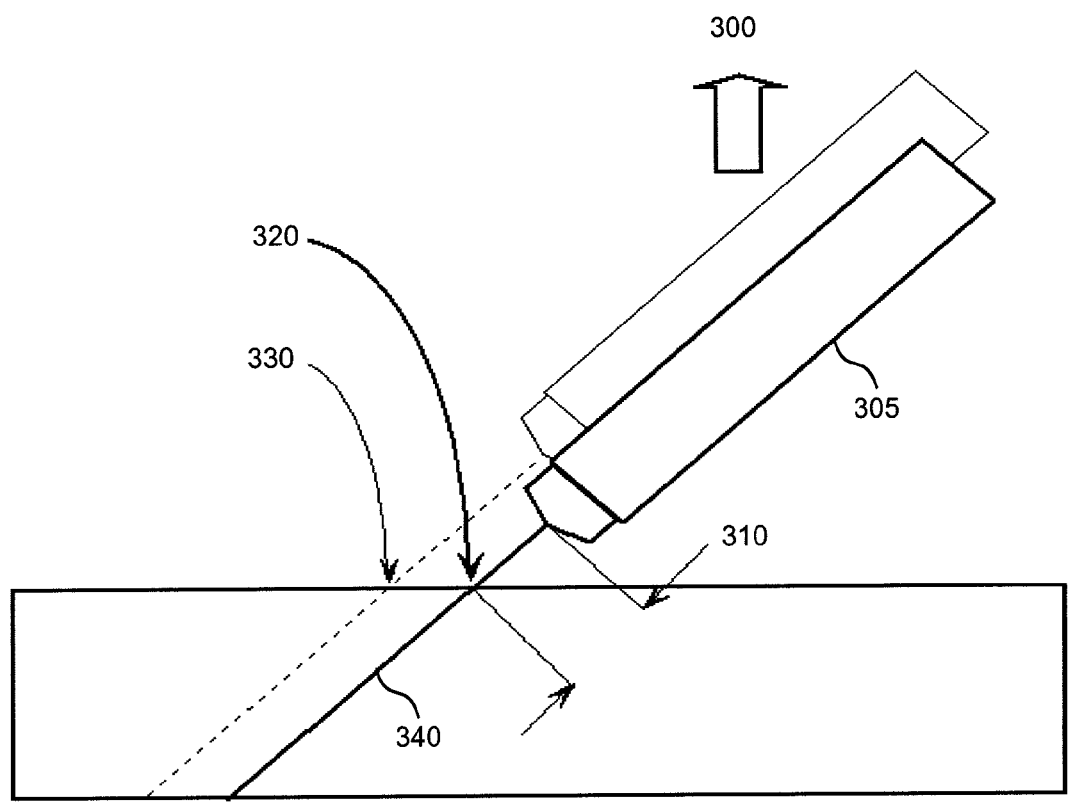
FIG. 3 illustrates an effect of vertical movement on the geometry of a part to be cut when using a tilted torch, according to the prior art.
Figure 4:
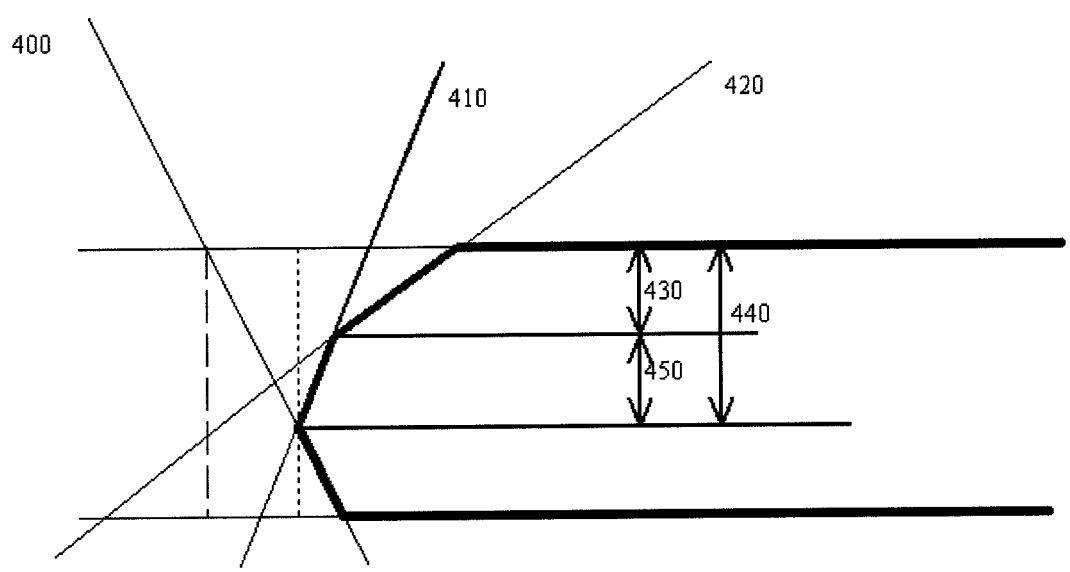
FIG. 4 shows a weld preparation involving three cuts to form a desired edge shape.

While the disclosed embodiments clearly offer advantages over the prior art, it should be understood that prior art systems, such as the system of FIG. 2, may nevertheless be incorporated. Not to determine the cutting height, but rather as a "safety" or secondary system. More particularly, scrap plate material can move vertically as a consequence of being cut, and the amount of vertical movement is impossible to predict. This could lead to machine damage if not noticed by an operator in a timely manner. By monitoring voltage, in accordance with the prior art, operator supervision may be less important, and extreme changes in voltage may cause the cutting torch to move (e.g., upwards) or turn off. For example, if the arc voltage dropped below a certain defined value, the machine could be stopped to prevent damage to the torch. In practice, scrap material movement is less of a problem when beveling, since the material for beveling tends to be relatively thick. Otherwise, the traditional sensor/height control feedback loop can be abandoned for the purpose of maintaining an accurate Z height, which is essential in multi-pass bevel cutting.

Figure 9:
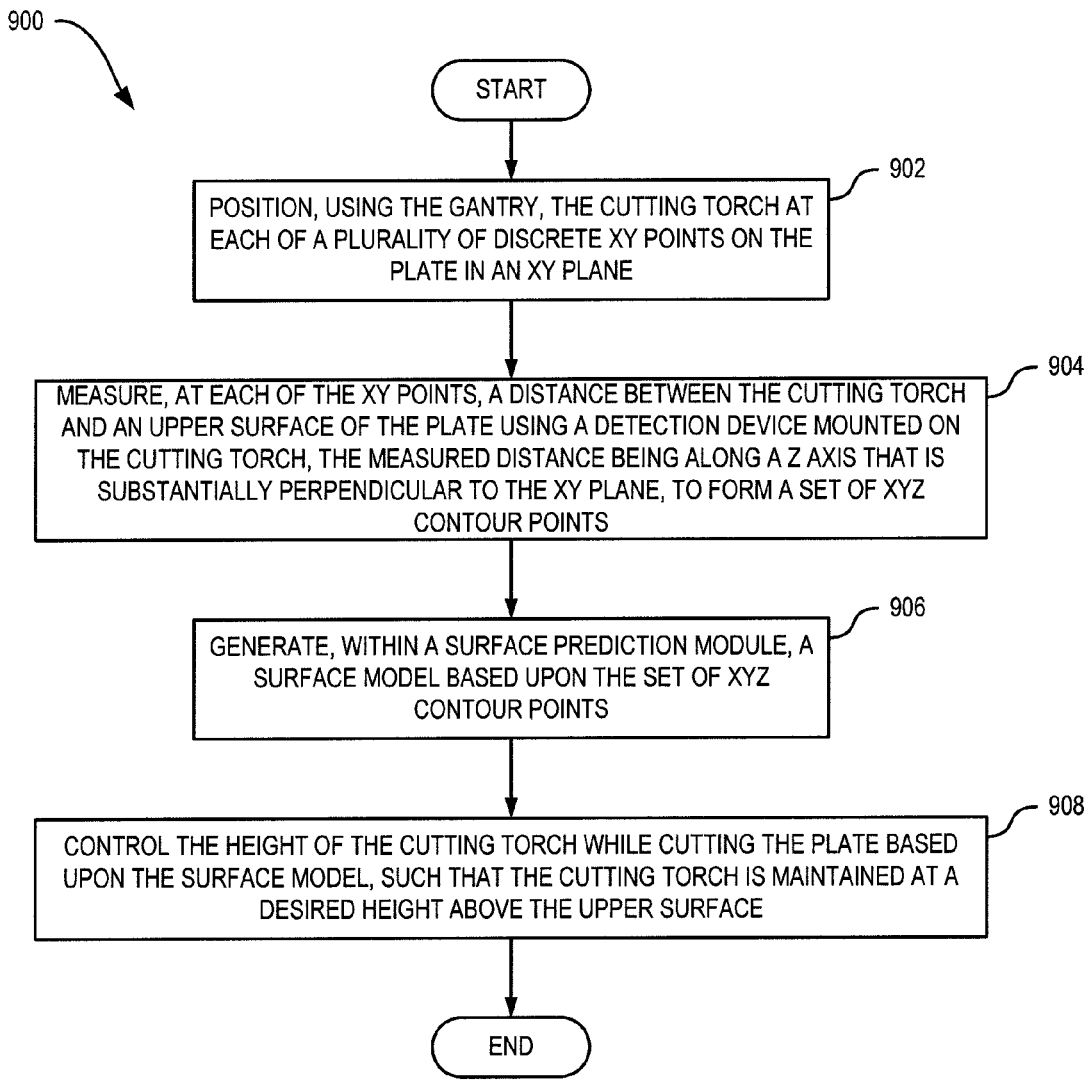
FIG. 9 is a flowchart illustrating one exemplary method for predictive torch height control.

FIG. 9 is a flowchart illustrating one exemplary method 900 of predictive torch height control that automatically adjusts a height of a cutting torch mounted on a gantry of a numerical control cutting machine with respect to a plate mounted on a cutting bed of the numerical control cutting machine. Steps 902 and 904 may be implemented within CNC 760 and steps 906 and 908 may be implemented within surface prediction module 750.

In step 902, method 900 positions, using the gantry, the cutting torch at each of a plurality of discrete XY points on the plate in an XY plane. In one example of step 902, the gantry of NC machine 699 is positioned at a first XY point 500(1), FIG. 5, with torch 705, FIG. 7, set to a desired height 710 above surface 708.

In step 904, method 900 measures, at each of the XY points, a distance between the cutting torch and an upper surface of the plate using a detection device mounted with the cutting torch, the measured distance being along a Z axis that is substantially perpendicular to the XY plane, to form a set of XYZ contour points. In one example of step 904, CNC 760 positions torch 705 at each XY position of XYZ contour points 500 and, at each XY position, uses measuring device 706 to measure a distance, along a Z axis substantially perpendicular to the XY plane, from torch 705 to surface 708, thereby determining height 710.

In step 906, method 900 generates, within a surface prediction module, a surface model based upon the set of XYZ contour points. In one example of step 906, surface prediction module 750 generates surface model 751 using a Bezier surface algorithm and based upon XYZ contour points 500.

In step 908, method 900 controls the height of the cutting torch while cutting the plate based upon the surface model, such that the cutting torch is maintained at a desired height above the upper surface. In one example of step 908, for each XY position 762 received from CNC 760, surface prediction module 750 derives Z value 764 from surface model 751, and sends Z value 764 to Z motor 700 to control the vertical position of torch 705 such that torch 705 is positioned at height 710 above surface 708 of plate 715.

Certain changes may be made in the systems and methods described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

I claim:

1. A method of predictive torch height control for adjusting a height of a cutting torch mounted on a gantry of a numerical control cutting machine with respect to a plate mounted on a cutting bed of the numerical control cutting machine, comprising the steps of:
   positioning, using the gantry, the cutting torch at each of a plurality of discrete XY points on the plate in an XY plane;
   measuring, prior to cutting the plate, a distance between the cutting torch and an upper surface of the plate at each of the plurality of discrete XY points using a detection device mounted with the cutting torch, the measured distance being along a Z axis that is substantially perpendicular to the XY plane, to form a set of XYZ contour points;
   generating, within a surface prediction module prior to cutting the plate, a surface model of the upper surface of the plate based upon the set of XYZ contour points; and
   controlling the height of the cutting torch while cutting the plate at any XY point on the plate based upon the surface model, such that the cutting torch is maintained at a desired height, according to the surface model, above the upper surface of the plate.

2. The method of claim 1, the step of controlling comprising controlling height of the cutting torch based upon Z axis values derived from the surface model at each of a plurality of XY positions on a cutting path of the cutting torch.

3. The method of claim 2, the plurality of XY positions being determined based upon a distance between XY positions.

4. The method of claim 2, the plurality of XY positions being determined based upon a regular time interval.

5. The method of claim 2, the plurality of XY positions being determined based upon variation in the surface model.

6. The method of claim 1, wherein the controlling of height automatically compensates for height variation induced by one or both of the gantry and the cutting bed.

7. The method of claim 1, the XY plane being substantially parallel to the cutting bed.

8. The method of claim 1, wherein the step of generating comprises mathematically modeling the surface model using non-linear interpolation of the XYZ contour points.

9. The method of claim 1, wherein the step of cutting is performed with the cutting torch angled with respect to a general plane of the workpiece.

10. A numerical control cutting machine with predictive torch height control, comprising:
    a cutting bed for supporting a plate to be cut;
    a gantry for traversing the cutting bed in an XY plane substantially parallel to the cutting bed;
    a cutting torch mounted on the gantry and having vertical positioning in a Z axis that is substantially perpendicular to the XY plane;
    a height measuring device for measuring the height of the cutting torch above an upper surface of the plate at each of a plurality of points in the XY plane, the height measuring device including one or more of a laser, an acoustic sensor and a mechanical sensor;
    a controller for controlling the gantry to move the cutting torch along a cutting path; and
    a surface prediction module, implemented as software executed by a processor of the controller, for predicting the height of the upper surface of the plate at any XY point based upon a surface model of the upper surface, the surface prediction model capable of generating the surface model from the measured height of the upper surface of the plate at each of the plurality of points in the XY plane,
    wherein the controller is capable of adjusting the vertical position of the cutting torch relative to the upper surface of the plate such that the cutting torch is substantially maintained at a predicted height, according to the surface model generated by the surface prediction module prior to the controller controlling the gantry to cut the plate, above the upper surface while the cutting torch is cutting the plate.

11. The numerical control cutting machine of claim 10, the surface model being mathematically generated based upon measured Z axis distances, between the upper surface and a measuring device mounted with the cutting torch on the gantry, at each of a plurality of XY positions across the surface of the plate prior to cutting the plate.

12. The numerical control cutting machine of claim 11, the XY positions being substantially evenly spaced across the upper surface.

13. The numerical control cutting machine of claim 11, the surface model being based upon non-linear interpolation of surface height between the XY positions.

14. The numerical control cutting machine of claim 11, the surface model being mathematically generated as a smooth surface representative of a contour of the upper surface of the plate.

15. The numerical control cutting machine of claim 10, wherein the cutting torch is angled with respect to the Z axis to create a bevel.

16. The numerical control cutting machine of claim 10, further comprising a voltage monitoring apparatus in communication with the controller for preventing damage to the cutting torch.

* * * * *